(12) United States Patent
Liu et al.

(10) Patent No.: US 11,747,679 B2
(45) Date of Patent: Sep. 5, 2023

(54) DISPLAY PANEL AND MANUFACTURING METHOD OF THE SAME

(71) Applicants: HEFEI BOE DISPLAY TECHNOLOGY CO., LTD., Anhui (CN); BOE TECHNOLOGY GROUP CO., LTD., Beijing (CN)

(72) Inventors: Jianming Liu, Beijing (CN); Chaoyue Wang, Beijing (CN); Wenbo Dong, Beijing (CN)

(73) Assignees: HEFEI BOE DISPLAY TECHNOLOGY CO., LTD, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 416 days.

(21) Appl. No.: 16/969,683

(22) PCT Filed: Nov. 7, 2019

(86) PCT No.: PCT/CN2019/116322
§ 371 (c)(1),
(2) Date: Aug. 13, 2020

(87) PCT Pub. No.: WO2021/087882
PCT Pub. Date: May 14, 2021

(65) Prior Publication Data
US 2022/0326557 A1 Oct. 13, 2022

(51) Int. Cl.
*G02F 1/1339* (2006.01)
*G02F 1/1343* (2006.01)
(Continued)

(52) U.S. Cl.
CPC .......... *G02F 1/1339* (2013.01); *G02F 1/1347* (2013.01); *G02F 1/133512* (2013.01);
(Continued)

(58) Field of Classification Search
None
See application file for complete search history.

(56) References Cited

U.S. PATENT DOCUMENTS

| 6,646,697 B1 | 11/2003 | Sekiguchi et al. |
| 2005/0094061 A1* | 5/2005 | Lee .................. G02F 1/133516 349/106 |

(Continued)

FOREIGN PATENT DOCUMENTS

| CN | 1234878 A | 11/1999 |
| CN | 109491155 A | 3/2019 |

(Continued)

*Primary Examiner* — Richard H Kim
(74) *Attorney, Agent, or Firm* — DINSMORE & SHOHL LLP

(57) ABSTRACT

The present disclosure provides a display panel and a manufacturing method of the display panel. The display panel includes: a display liquid crystal panel including a plurality of sub-pixels arranged in an array; a dimming liquid crystal panel located on a light incident side of the display liquid crystal panel and including a plurality of dimming pixels arranged in an array; and a sealant in a frame shape located between the dimming liquid crystal panel and the display liquid crystal panel, a surface of the sealant close to the dimming liquid crystal panel being adhered to the dimming liquid crystal panel, and a surface of the sealant close to the display liquid crystal panel being adhered to the display liquid crystal panel.

20 Claims, 4 Drawing Sheets

(51) Int. Cl.
  *G02F 1/1335* (2006.01)
  *G02F 1/1347* (2006.01)
(52) U.S. Cl.
  CPC .. *G02F 1/133528* (2013.01); *G02F 1/134345* (2021.01); *G02F 2203/48* (2013.01)

(56) References Cited

U.S. PATENT DOCUMENTS

| | | | |
|---|---|---|---|
| 2017/0285382 A1* | 10/2017 | Hasegawa | G06F 3/045 |
| 2018/0284553 A1* | 10/2018 | Yasui | G02F 1/1347 |
| 2020/0117032 A1 | 4/2020 | Chan et al. | |
| 2021/0215971 A1* | 7/2021 | Liao | G02F 1/133504 |

FOREIGN PATENT DOCUMENTS

| | | |
|---|---|---|
| CN | 111061098 A | 4/2020 |
| JP | 2003255390 A | 9/2003 |

* cited by examiner

DISPLAY PANEL AND MANUFACTURING METHOD OF THE SAME

CROSS-REFERENCE TO RELATED APPLICATIONS

The present application is a U.S. National Stage Application under 35 U.S.C. § 371 of International Patent Application No. PCT/CN2019/116322, filed on Nov. 7, 2019, the disclosure of which is incorporated by reference herein in its entirety.

TECHNICAL FIELD

The present disclosure relates to a display panel and a manufacturing method of the same.

BACKGROUND

Among flat panel display devices, the liquid crystal display device, with the characteristics such as small volume, low power consumption and relatively low manufacturing cost or radiation-free, occupies a dominant position in the display product market. How to improve the display quality of the liquid crystal display device and bring a better viewing experience to a user has always been a main research stream of those skilled in the art.

SUMMARY

According to one aspect of the embodiments of the present disclosure, provided is a display panel comprising: a display liquid crystal panel comprising a plurality of sub-pixels arranged in an array; a dimming liquid crystal panel located on a light incident side of the display liquid crystal panel and comprising a plurality of dimming pixels arranged in an array; and a sealant in a frame shape located between the dimming liquid crystal panel and the display liquid crystal panel, wherein one side of the sealant close to the dimming liquid crystal panel is adhered to the dimming liquid crystal panel, and one side of the sealant close to the display liquid crystal panel is adhered to the display liquid crystal panel.

In some embodiments, the sealant is in an enclosed frame shape, and a box-shaped cavity enclosed by the sealant, the dimming liquid crystal panel, and the display liquid crystal panel is a vacuum cavity.

In some embodiments, a width of the sealant is 2 mm to 5 mm; and/or a distance between an outer edge of the sealant and an edge of the dimming liquid crystal panel is 0.5 mm to 2 mm.

In some embodiments, the display panel further comprises a plurality of support units located between the display liquid crystal panel and the dimming liquid crystal panel and located inside the sealant.

In some embodiments, the display liquid crystal panel comprises a first light shielding matrix, wherein in a direction perpendicular to the display liquid crystal panel, each of the plurality of support units is located within a light shielding area of the first light shielding matrix; and/or the dimming liquid crystal panel comprises a second light shielding matrix, and in a direction perpendicular to the dimming liquid crystal panel, each of the plurality of support units is located within a light shielding area of the second light shielding matrix.

In some embodiments, the plurality of support units is formed on one side of the dimming liquid crystal panel close to the display liquid crystal panel; or the plurality of support units is formed on one side of the display liquid crystal panel close to the dimming liquid crystal panel; or one side of each of the plurality of support units close to the dimming liquid crystal panel is adhered to the dimming liquid crystal panel, and one side of each of the plurality of support units close to the display liquid crystal panel is adhered to the display liquid crystal panel.

In some embodiments, an equivalent cylinder diameter of each of the plurality of support units is 0.1 mm to 0.3 mm; and/or a distribution density of the plurality of support units is 1.8 mm2/cm2 to 7.1 mm2/cm2; and/or a height of each of the plurality of support units is 0.02 mm to 0.4 mm.

In some embodiments, the shapes of the plurality of support units comprise a cylindrical shape, a conical shape, or a cube shape.

In some embodiments, materials of the plurality of support units and the sealant are the same, and comprise optically clear adhesive, optical clear resin or polyacrylate glue.

In some embodiments, the display liquid crystal panel further comprises a first polarizer located on one side of the display liquid crystal panel close to the dimming liquid crystal panel; and the sealant is located outside an edge of the first polarizer, or one side of the sealant away from the dimming liquid crystal panel is adhered to the first polarizer.

In some embodiments, the display liquid crystal panel further comprises a second polarizer located on one side of the display liquid crystal panel away from the dimming liquid crystal panel and having a haze of 15%-30%.

According to another aspect of the embodiments of the present disclosure, provided is a manufacturing method of a display panel, comprising: forming a sealant in a frame shape on a light exit side of a dimming liquid crystal panel or a light incident side of a display liquid crystal panel; and aligning and adhering the dimming liquid crystal panel and the display liquid crystal panel by the sealant.

In some embodiments, the manufacturing method further comprises: forming a plurality of support units on the light exit side of the dimming liquid crystal panel or the light incident side of the display liquid crystal panel, before the aligning and the adhering, wherein after the aligning and the adhering, in a direction perpendicular to the display liquid crystal panel, each of the plurality of support units is within a light shielding area of a light shielding matrix of the display liquid crystal panel; and/or in a direction perpendicular to the dimming liquid crystal panel, each of the plurality of support units is located within a light shielding area of a light shielding matrix of the dimming liquid crystal panel.

In some embodiments, the sealant is in an enclosed frame shape, and the dimming liquid crystal panel and the display liquid crystal panel is aligned and adhered by the sealant in a vacuum environment.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
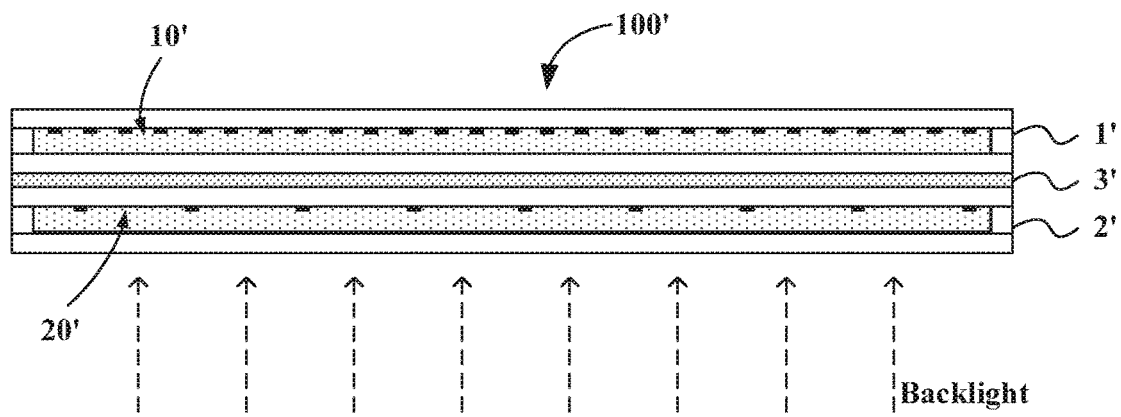
FIG. 1 is a schematic view showing a cross-sectional structure of a display panel in the related art.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

Currently, a common type of display device in market is a liquid crystal display device. The structure of a conventional liquid crystal display device generally comprises a liquid crystal display panel and a backlight module located on a light incident side of the liquid crystal display panel. The liquid crystal display panel comprises an array substrate and a filter substrate arranged opposite to each other to form a liquid crystal cell, a liquid crystal located between the array substrate and the filter substrate, a first polarizer located on one side of the array substrate away from the filter substrate, and a second polarizer located on one side of the filter substrate away from the array substrate. The array substrate is closer to the backlight module than the filter substrate, and a polarization direction of the first polarizer is orthogonal to that of the second polarizer. The liquid crystal display panel comprises a plurality of pixel units, each of which comprises a plurality of sub-pixels with colors different from each other. Light exited from the sub-pixels of a same pixel unit is mixed according to a certain proportion, so that color light visible to human eye is displayed by the pixel unit. With own structural characteristics, such type of conventional liquid crystal display device is present with technical defects such as poor screen contrast and dark-state light leakage.

In order to improve the above defects, a liquid crystal display device using dual-screen driving technology is proposed in the related art. The liquid crystal display device differs from the above conventional liquid crystal display device in that, as shown in FIG. 1, the display panel 100' comprises a dimming liquid crystal panel 2' and a display liquid crystal panel 1'. The dimming liquid crystal panel 2' and the display liquid crystal panel 1' are adhered together through a planar adhesive layer 3'. The display liquid crystal panel 1' is similar to the above liquid crystal display panel in structure and operational principles. The dimming liquid crystal panel 2' is located on a light incident side of the display liquid crystal panel 1' and on a light exiting side of the backlight module which is not shown (the light exiting from the backlight module is shown by the dotted arrow), and comprises a plurality of dimming pixels 20' arranged in an array. Each dimming pixel 20' serving as a dimming unit is opposite to several sub-pixels 10' of the display liquid crystal panel 1'. Each dimming is configured to control the direction and intensity of the backlight incident into a corresponding area of the display liquid crystal panel 1' via the dimming pixel 20'.

The liquid crystal display device in the related art may implement finer area dimming of a screen in the principle of adjusting a light transmittance (i.e., a direction and/or intensity that allows passage of the backlight) of a corresponding dimming pixel 20' of the dimming liquid crystal panel 2' according to gray scales of different areas of the displayed screen. For example, for an area with a high screen brightness, the light transmittance of a corresponding dimming pixel 20' of the dimming liquid crystal panel 2' is also adjusted to be relatively high; for an area with a low screen brightness, the light transmittance of a corresponding dimming pixel 20' of the dimming liquid crystal panel 2' is also adjusted to be relatively low; and for an area where a black screen is displayed, the light transmittance of a corresponding dimming pixel 20' of the dimming liquid crystal panel 2' is adjusted to be substantially zero. Compared with the above conventional liquid crystal display device, this type of liquid crystal display device may overcome the defect of dark-state light leakage of the screen, and significantly improve the contrast, thereby bringing a better viewing experience for a user. Especially, when the liquid crystal display device displays HDR (High-Dynamic Range) screen, the area dimming makes a wider brightness range of the screen, a more natural low gray-level transition, and a better display effect.

However, for the above display panel that may achieve area dimming, it is difficult to ensure the thickness uniformity and surface flatness of the adhesive layer, which leads to a display screen often presenting with defects such as stripe, rainbow pattern, or color cast. Moreover, since having a certain thickness, the adhesive layer cannot have a transmittance of 100%, thus leading to a relatively large influence on the light transmittance of the display panel. In order to meet the brightness requirements of a screen, it is necessary to increase the power consumption of the backlight, thereby resulting in higher energy consumption of the display device. In addition, the adhesive layer also increases the thickness and weight of the display panel, which is not favorable for the ultra-light and ultra-thin design of the display device.

To solve the above technical problem, the embodiments of the present disclosure provide a display panel, a display device, and a manufacturing method of the display panel.

Figure 2:
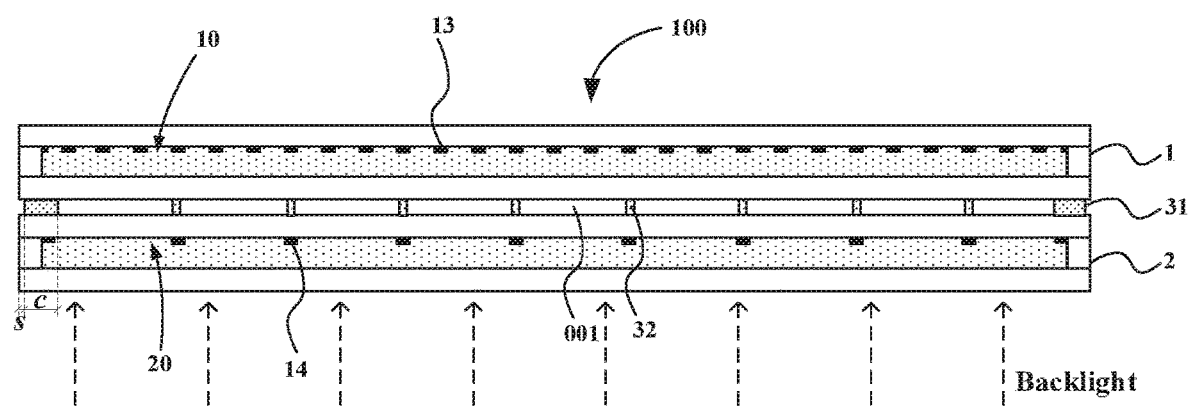
FIG. 2 is a schematic view showing a cross-sectional structure of a display panel according to an embodiment of the present disclosure.
Figure 3:
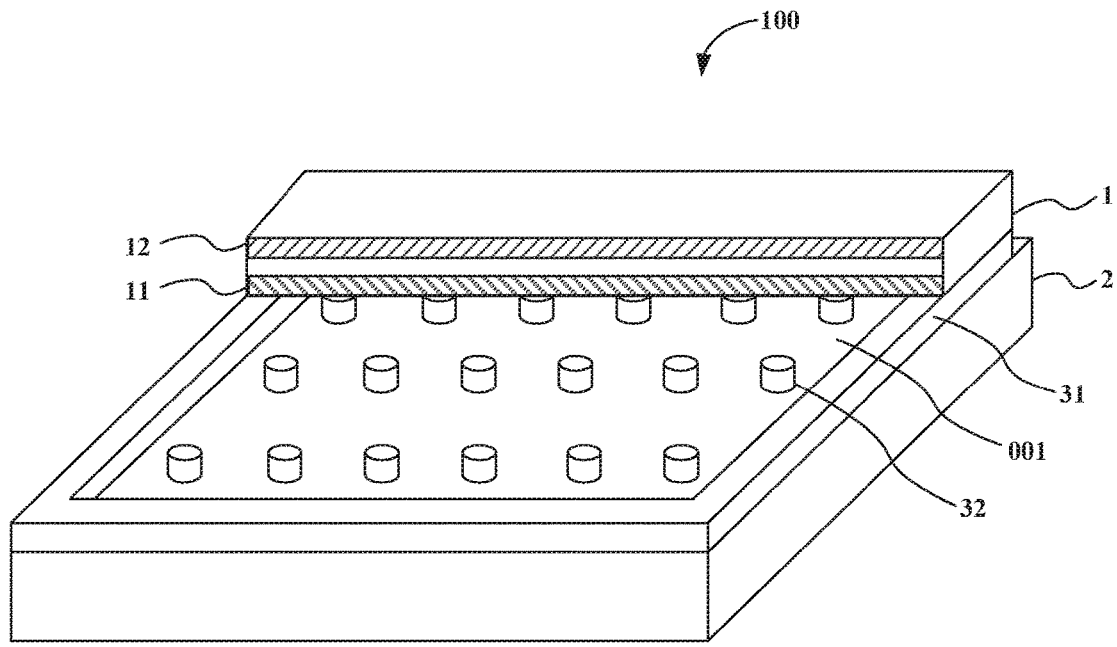
FIG. 3 is a schematic view showing a three-dimensional structure of a display panel according to an embodiment of the present disclosure.

As shown in FIGS. 2 and 3, the display panel 100 provided by an embodiment of the present disclosure comprises: a display liquid crystal panel 1 comprising a plurality of sub-pixels 10 arranged in an array; a dimming liquid crystal panel 2 located on a light incident side of the display liquid crystal panel 1, and comprising a plurality of dimming pixels 20 arranged in an array; and a sealant 31 in a frame shape located between the dimming liquid crystal panel 2 and the display liquid crystal panel 1, wherein a surface of the sealant 31 close to the dimming liquid crystal panel 2 is adhered to the dimming liquid crystal panel 2, and a surface of the sealant 31 close to the display liquid crystal panel 1 is adhered to the display liquid crystal panel 1.

The display liquid crystal panel 1 is configured to display screen, and the dimming liquid crystal panel 2 is configured to adjust the light transmittance of a corresponding dimming pixel 20 according to the gray-levels of different areas of the screen displayed by the display liquid crystal panel 1. Regarding the structure and operational principles of the display liquid crystal panel 1 and the dimming liquid crystal panel 2, reference may be made to the foregoing description of the related art, and thus this will not be described repeatedly.

For the display panel in the related art, it is difficult to ensure the thickness uniformity and surface flatness of the adhesive layer connecting the display liquid crystal panel 1 and the dimming liquid crystal panel 2, the display screen is often present with defects such as stripe, rainbow pattern, or color cast. Further, the adhesive layer also has a relatively large influence on the light transmittance of the display panel, thereby increasing the power consumption of the display device. In addition, the adhesive layer also increases the thickness and weight of the display panel.

In the technical solutions of the above embodiments of the present disclosure, the design of a non-planar sealant 31 in a frame shape is used, thereby avoiding the above technical problems resulting from the difficulty to ensure uniform thickness and surface flatness of the planar adhesive layer, and improving defects such as stripe, rainbow pattern, and color cast of the display screen. The sealant 31 is disposed at a position close to an edge of the display panel and not at an effective display area of the display panel, and thus substantially having no influence on the light transmittance of the display panel, which is beneficial to reduce the power consumption of the display device. In addition, the thickness and weight of the display panel are reduced by using the design of the non-planar sealant 31.

As shown in FIGS. 2 and 3, in an embodiment of the present disclosure, the display panel further comprises a plurality of support units 32 located between the display liquid crystal panel 1 and the dimming liquid crystal panel 2, and located inside the sealant 31, that is, located on one side of the sealant 31 close to the effective display area. The plurality of support units 32 are supported between the display liquid crystal panel 1 and the dimming liquid crystal panel 2, which may effectively avoid that the display liquid crystal panel 1 and the dimming liquid crystal panel 2 are oppositely bent, and avoid water ripples produced by the attachment between the display liquid crystal panel 1 and the dimming liquid crystal panel 2. Thus, a uniform thickness of a box-shaped cavity 001 enclosed by the sealant 31, the dimming liquid crystal panel 2 and the display liquid crystal panel 1 is achieved, which is beneficial to improve the display quality of the display panel. In an embodiment, the plurality of support units 32 is uniformly arranged in an array. The plurality of support units 32 and the sealant 31 separate the display liquid crystal panel 1 from the dimming liquid crystal panel 2 and ensure that the spacing between the display liquid crystal panel 1 and the dimming liquid crystal panel 2 is uniform.

The shapes of the support unit 32 is not limited, and may be in the shape of a cylinder, cone or cube and the like. As shown in FIG. 3, in some embodiments of the present disclosure, the shape of the support unit 32 is cylindrical. In other embodiments of the present disclosure, the shape of the support unit 32 may also be frustoconical. More options for the shape of the support units 32 will not be listed one by one here.

In some embodiments of the present disclosure, the equivalent cylinder diameter of the support unit 32 (that is, a diameter of a bottom surface of a cylinder to which the support unit 32 is equivalent) may be designed to be 0.1 mm to 0.3 mm, which is slightly greater than a designed width of an gate line of the display liquid crystal panel 1, so as to ensure the mechanical strength of the support unit 32. The distribution density of the plurality of support units 32 (that is, the value of the area occupied by the orthographic projection of plurality of support units 32 on the dimming liquid crystal panel 2 per square meter centimeter) may be designed to be 1.8 $mm^2/cm^2$ to 7.1 $mm^2/cm^2$. The height of the support unit 32 may be designed to be 0.02 mm to 0.4 mm. The specific size and arrangement spacing and the like of the support units 32 may be determined in combination with factors such as a structural size of the display panel, a weight of the display panel, an atmospheric pressure, a maximum support force designed, and an optical influence.

When the display panel is manufactured, the support units 32 may be pre-formed on one side of the dimming liquid crystal panel 2 close to the display liquid crystal panel 1, or pre-formed on one side of the display liquid crystal panel 1 close to the dimming liquid crystal panel 2. The support unit 32 may be made from an organic material or an inorganic material and may be formed by a patterning process. In addition, the support unit 32 may also be made from an adhesive-like material and pre-coated on the display liquid crystal panel 1 or the dimming liquid crystal panel 2. For example, in some embodiments, the support unit 32 is made from an adhesive-like material, a surface of the support unit 32 close to the dimming liquid crystal panel 2 is adhered to the dimming liquid crystal panel 2, and a surface of the support unit 32 close to the display liquid crystal panel 1 is adhered to the display liquid crystal panel 1.

In some embodiments of the present disclosure, the material of the support unit 32 is the same as that of the sealant 31, so that the sealant 31 has the same material compression rate as that of the support unit 32, which may further improve the uniformness of the thickness of the box-shaped cavity 001 formed by the dimming liquid crystal panel 2 and the display liquid crystal panel 1. The materials of the support unit 32 and the sealant 31 are not limited, and may be, for example, an optically clear adhesive (OCA), an optical clear resin (OCR) or a polyacrylate glue (VHB glue) and the like.

As shown in FIG. 2, the display liquid crystal panel 1 is normally provided with a first light shielding matrix 13 for shielding structures such as a gate line, a data line, and a thin film transistor (not shown). In some embodiments of the present disclosure, in a direction perpendicular to the display liquid crystal panel 1, the support unit 32 is located within a light shielding area of the first light shielding matrix 13. That is, viewed from a light exit side of the display liquid crystal panel 1, the support unit 32 is shielded by the first light shielding matrix 13 and invisible. With this design, the positions where the support units 32 are provided avoid opening areas of the sub-pixels 10, thereby basically not affecting the optical uniformity of the display panel.

As shown in FIG. 2, the dimming liquid crystal panel 2 is normally provided with a second light shielding matrix 14 for shielding its gate lines (not shown). Since the resolution of the display liquid crystal panel 1 is different from that of the dimming liquid crystal panel 2, the pattern of the first light shielding matrix 13 is also usually different from that of the second light shielding matrix 14. In some embodiments of the present disclosure, in a direction perpendicular to the dimming liquid crystal panel 2, the support unit 32 may also be located within a light shielding area of the second light shielding matrix 14, and avoid opening areas of the dimming pixels 20, thereby basically not affecting the aperture ratio of the dimming liquid crystal panel.

In the embodiments of the present disclosure, the sealant 31 may be in an enclosed frame shape or a non-enclosed frame shape. As shown in FIG. 3, in some embodiments of the present disclosure, the sealant 31 is in an enclosed frame shape, for example a square shape, and the box-shaped cavity enclosed by the sealant 31, the dimming liquid crystal panel 2 and the display liquid crystal panel 1 001 is a vacuum chamber. That is, there is no air between the dimming liquid crystal panel 2 and the display liquid crystal panel 1, which may reduce rainbow pattern might resulting from transmission of light in the air as well as halo at an edge of the sub-pixels, thereby further improving the display quality of the display panel. In addition, the dimming liquid crystal panel 2 is adhered to the display liquid crystal panel 1 in a vacuum environment, which may also improve the viscosity of adhesion. In some other embodiments of the present disclosure, the sealant may also be in a non-enclosed frame shape, for example, comprise a plurality of sealant segments spaced apart and arranged substantially in a square shape.

Referring to FIG. 2, in some embodiments of the present disclosure, the width of the sealant 31 meets a formula of $c=(0.5*b*Q)/P$, where c is the width of the sealant in millimeters (mm), b is a length of a short side of the dimming liquid crystal panel in millimeters, Q is an average wind load in a conventional operational environment in kilopascals (kPa), and P is an adhesive strength of the material of the sealant 31 in kilopascals. According to this design rule, the width c of the sealant 31 may be designed to be 2 mm to 5 mm.

In some embodiments of the present disclosure, the distance between an outer edge of the sealant 31 and an edge of the dimming liquid crystal panel 2 meets a formula of $s=(t-c)/2$, where s is the distance between the outer edge of the sealant and the edge of the dimming liquid crystal panel, t is a width of the second light shielding matrix opposite to the sealant in position in millimeters, c is the width of the sealant in millimeters. According to this design rule, the distance between the outer edge of the sealant 31 and the edge of the dimming liquid crystal panel 2 may be designed to be 0.5 mm to 2 mm.

In an embodiment of the present disclosure, as shown in FIG. 3, the display liquid crystal panel 1 comprises a first polarizer 11 located on one side of the a first light shielding matrix 13 close to the dimming liquid crystal panel 2, and a surface of the sealant 31 away from the dimming liquid crystal panel 2 is adhered to the first polarizer 11. In another embodiment of the present disclosure, as shown in FIG. 4, the sealant 31 is located outside an edge of the first polarizer 11, thereby further reducing the thickness of the display panel 100.

Figure 4:
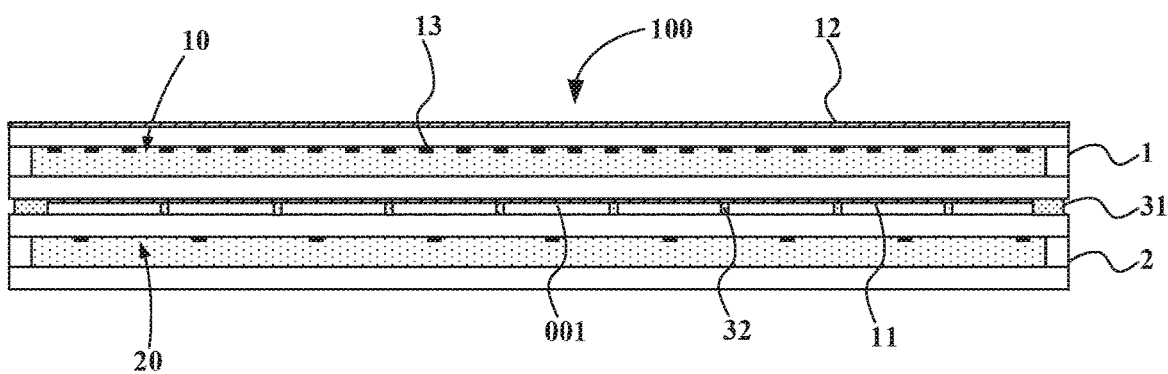
FIG. 4 is a schematic view showing a cross-sectional structure of a display panel according to another embodiment of the present disclosure.

As shown in FIG. 4, in an embodiment of the present disclosure, the display liquid crystal panel 1 further comprises a second polarizer 12 located on one side of the first light shielding matrix 13 away from the dimming liquid crystal panel 2. The polarization direction of the second polarizer 12 is orthogonal to that of the first polarizer 11. The haze of the second polarizer 12 may be designed to be 15%-30%. For example, the haze of the second polarizer 12 is 25%. In this way, the optical influence of the support units 32 on the display panel is further weaken, and the optical uniformity of the display panel is further improved.

Figure 5:
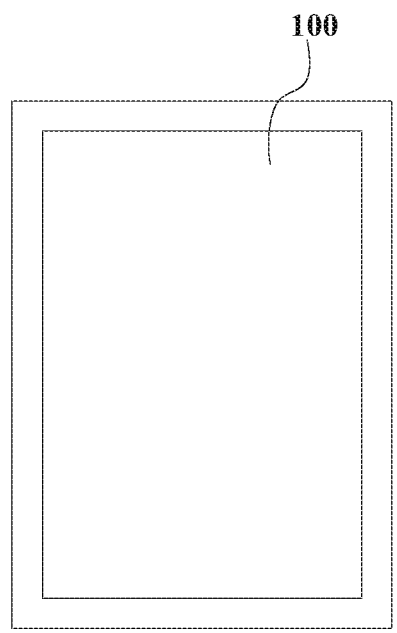
FIG. 5 is a front view showing a display device according to an embodiment of the present disclosure.

As shown in FIG. 5, the embodiments of the present disclosure also provide a display device comprising the display panel 100 according to any one of the foregoing embodiments. Compared with the related art, the display device has a higher screen display quality, lower power consumption, a smaller thickness, and a smaller weight, thereby significantly improving the experience of a user. The display device is not limited to a specific product type, and may be, for example, a display, a tablet computer, a notebook computer, a television, an automatic teller machine (ATM) device, an electronic paper, an exhibit screen, and the like.

Figure 6:
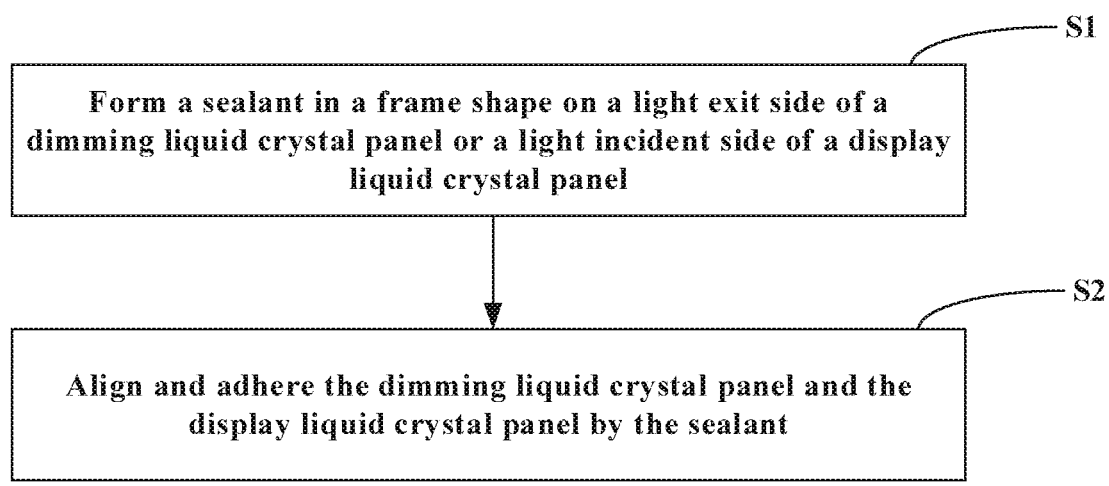
FIG. 6 is a flowchart showing a manufacturing method of a display panel according to an embodiment of the present disclosure.

As shown in FIG. 6, the embodiments of the present disclosure also provide a manufacturing method of a display panel comprising the following steps S1 and S2.

At step S1, a sealant in a frame shape is formed on a light exit side of a dimming liquid crystal panel or a light incident side of a display liquid crystal panel.

At step S2, the dimming liquid crystal panel and the display liquid crystal panel are aligned and adhered by the sealant.

In some embodiments of the present disclosure, before the step S2, the manufacturing method of a display panel further comprises a step of forming a plurality of support units on the light exit side of the dimming liquid crystal panel or on the light incident side of the display liquid crystal panel. In a direction perpendicular to the display liquid crystal panel, each support unit is located within a light shielding area of a first light shielding matrix of the display liquid crystal panel; and/or, in a direction perpendicular to the dimming liquid crystal panel, each support unit is within a light shielding area of a second light shielding matrix of the dimming liquid crystal panel.

The step of forming the plurality of support units may be performed before the step S1 or performed after the step S1 and before the step S2.

In some embodiments of the present disclosure, the support units and the sealant are made from the same material and may be both formed on a surface of the dimming liquid crystal panel or on a surface of the display liquid crystal panel. Regarding the parameter design, material option and the like of the support units and the sealant, reference may be made to the foregoing description of the embodiments of the display panel, which will not be described in detail here.

In some embodiments of the present disclosure, the sealant is in an enclosed frame shape, and the dimming liquid crystal panel and the display liquid crystal panel are aligned and adhered in a vacuum environment.

Figure 7:
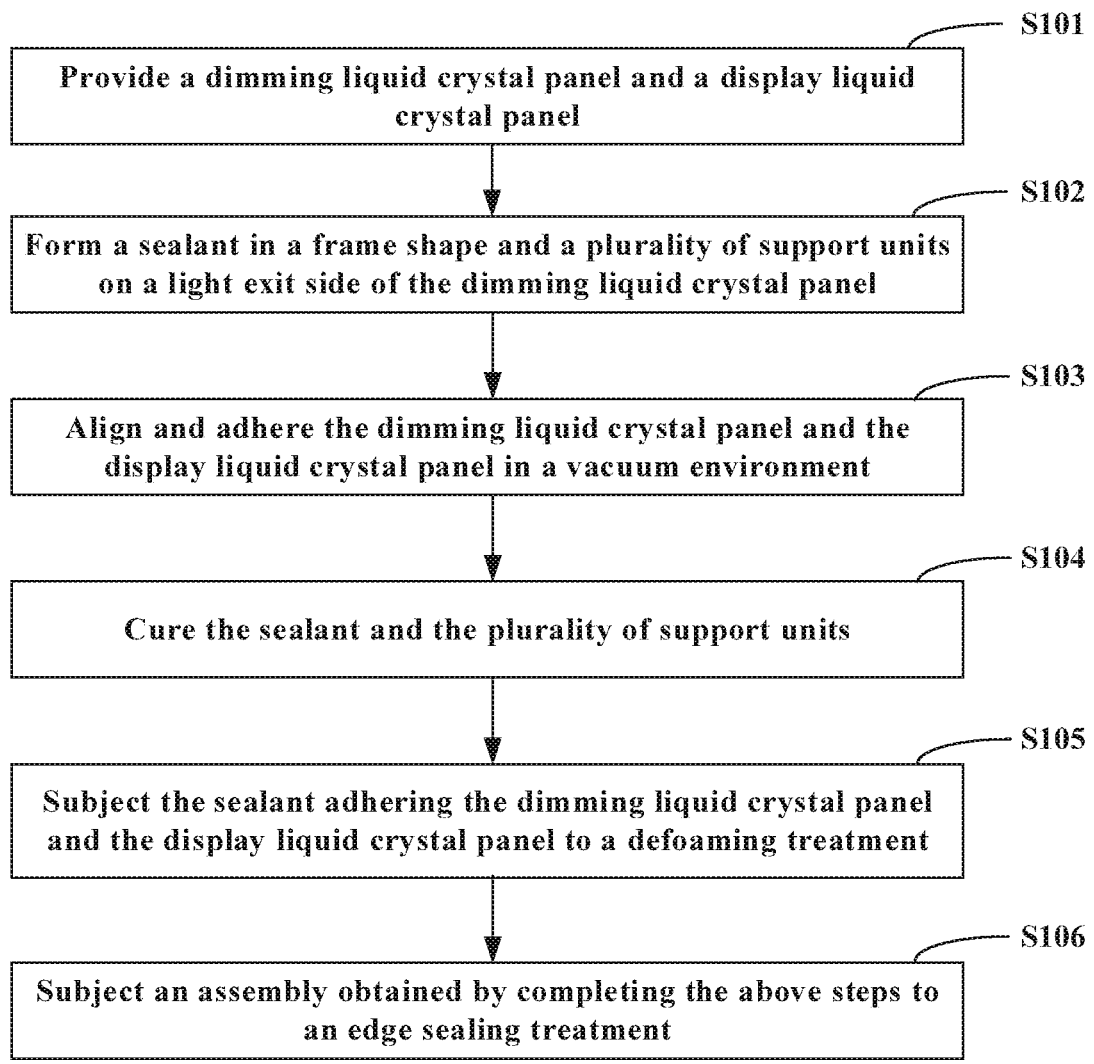
FIG. 7 is a flowchart showing a manufacturing method of a display panel according to another embodiment of the present disclosure.

As shown in FIG. 7, in another embodiment of the present disclosure, the manufacturing method of the display panel comprises the following steps S101 to S106.

At step S101, a dimming liquid crystal panel and a display liquid crystal panel are provided.

At step S102, a sealant in a frame shape and a plurality of support units are formed on a light exit side of the dimming liquid crystal panel.

At step S103, the dimming liquid crystal panel and the display liquid crystal panel are aligned and adhered in a vacuum environment.

At step S104, the sealant and the plurality of support units are cured. According to different specific materials, the sealant and the plurality of support units may be thermally cured or naturally cured to improve their adhesive strength and morphological stability.

At step S105, the sealant adhering the dimming liquid crystal panel and the display liquid crystal panel is subjected to a defoaming treatment. For example, the defoaming treatment is performed by a vacuum defoaming process to further improve the adhesive strength of the sealant.

At step S106, an assembly obtained by completing the above steps is subjected to an edge sealing treatment to improve the sealing property of the edge of the assembly.

Compared with the related art, the display panel manufactured using the manufacturing method in the above embodiments of the present disclosure may effectively improve defects such as stripe, rainbow pattern, and color cast of the display screen, and is beneficial to reduce the power consumption of the display device and reduce the thickness and weight of the display device.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A display panel, comprising:
   a display liquid crystal panel comprising a plurality of sub-pixels arranged in an array;
   a dimming liquid crystal panel located on a light incident side of the display liquid crystal panel and comprising a plurality of dimming pixels arranged in an array, the dimming liquid crystal panel is configured to adjust a light transmittance of a corresponding dimming pixel according to gray-levels of different areas of a screen displayed by the display liquid crystal panel;
   a sealant in a frame shape located between the dimming liquid crystal panel and the display liquid crystal panel, wherein a surface of the sealant close to the dimming liquid crystal panel is adhered to the dimming liquid crystal panel, and a surface of the sealant close to the display liquid crystal panel is adhered to the display liquid crystal panel; and
   a plurality of support units located between the display liquid crystal panel and the dimming liquid crystal panel and located inside the sealant,
   wherein each of the plurality of support units and the sealant have a same material compression rate,
   wherein a width of the sealant is 2 mm to 5 mm, and a distance between an outer edge of the sealant and an edge of the dimming liquid crystal panel is 0.5 mm to 2 mm, and
   wherein the display liquid crystal panel further comprises a second polarizer located on one side of the plurality of sub-pixels away from the dimming liquid crystal panel and having a haze of 15%-30%.

2. The display panel according to claim 1, wherein the sealant is in an enclosed frame shape, and a box-shaped cavity enclosed by the sealant, the dimming liquid crystal panel, and the display liquid crystal panel is a vacuum cavity.

3. The display panel according to claim 1, wherein:
   the display liquid crystal panel comprises a first light shielding matrix, wherein in a direction perpendicular to the display liquid crystal panel, each of the plurality of support units is located within a light shielding area of the first light shielding matrix; and
   the dimming liquid crystal panel comprises a second light shielding matrix, and in a direction perpendicular to the dimming liquid crystal panel, each of the plurality of support units is located within a light shielding area of the second light shielding matrix.

4. The display panel according to claim 3, wherein:
   the display liquid crystal panel further comprises a first polarizer located on one side of the first light shielding matrix close to the dimming liquid crystal panel; and
   the surface of the sealant close to the display liquid crystal panel is adhered to the first polarizer.

5. A display device, comprising the display panel according to claim 3.

6. The display panel according to claim 1, wherein a surface of each of the plurality of support units close to the dimming liquid crystal panel is adhered to the dimming liquid crystal panel, and a surface of each of the plurality of support units close to the display liquid crystal panel is adhered to the display liquid crystal panel.

7. The display panel according to claim 1, wherein the plurality of support units has at least one of the following features:
- an equivalent cylinder diameter of each of the plurality of support units is 0.1 mm to 0.3 mm;
- a distribution density of the plurality of support units is 1.8 $mm^2/cm^2$ to 7.1 $mm^2/cm^2$; or
- a height of each of the plurality of support units is 0.02 mm to 0.4 mm.

8. A display device, comprising the display panel according to claim 7.

9. The display panel according to claim 1, wherein shapes of the plurality of support units comprise a cylindrical shape, a conical shape, or a cube shape.

10. The display panel according to claim 1, wherein materials of the plurality of support units and the sealant are the same.

11. The display panel according to claim 10, wherein the materials of the plurality of support units and the sealant comprise optically clear adhesive, optical clear resin or polyacrylate glue.

12. A display device, comprising the display panel according to claim 10.

13. The display panel according to claim 1, wherein:
- the display liquid crystal panel further comprises a first light shieling matrix and a first polarizer located on one side of the first light shielding matrix close to the dimming liquid crystal panel; and
- the sealant is located outside an edge of the first polarizer.

14. The display panel according to claim 1, wherein:
- the display liquid crystal panel comprises a first light shielding matrix; and
- in a direction perpendicular to the display liquid crystal panel, each of the plurality of support units is located within a light shielding area of the first light shielding matrix.

15. The display panel according to claim 1, wherein:
- the dimming liquid crystal panel comprises a second light shielding matrix; and
- in a direction perpendicular to the dimming liquid crystal panel, each of the plurality of support units is located within a light shielding area of the second light shielding matrix.

16. The display panel according to claim 1, wherein the plurality of support units is located on one of a surface of the dimming liquid crystal panel close to the display liquid crystal panel and a surface of the display liquid crystal panel close to the dimming liquid crystal panel.

17. A display device, comprising the display panel according to claim 1.

18. A manufacturing method of a display panel, comprising:
- forming a sealant in a frame shape and a plurality of support units on a light exit side of a dimming liquid crystal panel or a light incident side of a display liquid crystal panel comprising a plurality of sub-pixels arranged in an array, wherein the plurality of support units is located inside the sealant, the dimming liquid crystal panel comprises a plurality of dimming pixels arranged in an array, and the dimming liquid crystal panel is configured to adjust a light transmittance of a corresponding dimming pixel according to gray-levels of different areas of a screen displayed by the display liquid crystal panel; and
- aligning and adhering the dimming liquid crystal panel and the display liquid crystal panel by the sealant,
- wherein each of the plurality of support units and the sealant have a same material compression rate,
- wherein a width of the sealant is 2 mm to 5 mm, and a distance between an outer edge of the sealant and an edge of the dimming liquid crystal panel is 0.5 mm to 2 mm, and
- wherein the display liquid crystal panel further comprises a second polarizer located on one side of the plurality of sub-pixels away from the dimming liquid crystal panel and having a haze of 15%-30%.

19. The manufacturing method according to claim 18, wherein after the aligning and the adhering, in a direction perpendicular to the display liquid crystal panel, each of the plurality of support units is within a light shielding area of a first light shielding matrix of the display liquid crystal panel; and/or in a direction perpendicular to the dimming liquid crystal panel, each of the plurality of support units is located within a light shielding area of a second light shielding matrix of the dimming liquid crystal panel.

20. The manufacturing method according to claim 18, wherein the sealant is in an enclosed frame shape, and the dimming liquid crystal panel and the display liquid crystal panel is aligned and adhered by the sealant in a vacuum environment.

* * * * *